United States Patent
Thakur et al.

(10) Patent No.: US 11,907,320 B2
(45) Date of Patent: Feb. 20, 2024

(54) DIGITAL CONTENT OPERATION TESTING

(71) Applicant: Adobe Inc., San Jose, CA (US)

(72) Inventors: Nishant Kumar Thakur, Nodia (IN); Sandeep Kambi Nanjundeshwara, Bengaluru (IN); Rafiya Sirin, Bhubaneswar (IN)

(73) Assignee: Adobe Inc., San Jose, CA (US)

( * ) Notice: Subject to any disclaimer, the term of this patent is extended or adjusted under 35 U.S.C. 154(b) by 50 days.

(21) Appl. No.: 17/743,730

(22) Filed: May 13, 2022

(65) Prior Publication Data

US 2023/0367834 A1    Nov. 16, 2023

(51) Int. Cl.
*G06F 16/957* (2019.01)
*H04L 43/045* (2022.01)
*H04L 43/55* (2022.01)

(52) U.S. Cl.
CPC .......... *G06F 16/957* (2019.01); *H04L 43/045* (2013.01); *H04L 43/55* (2022.05)

(58) Field of Classification Search
CPC ...... H04L 43/045; H04L 43/55; G06F 16/957
See application file for complete search history.

(56) References Cited

U.S. PATENT DOCUMENTS

| | | | | |
|---|---|---|---|---|
| 7,373,415 B1 * | 5/2008 | DeShan | ................... | H04L 43/50 709/231 |
| 2012/0110515 A1 * | 5/2012 | Abramoff | ............. | G06F 16/904 715/854 |
| 2012/0246310 A1 * | 9/2012 | Broda | ................... | G06T 11/206 709/224 |
| 2017/0323329 A1 * | 11/2017 | Katariya | ............ | G06Q 30/0244 |
| 2018/0091609 A1 * | 3/2018 | Xu | ........................... | H04L 43/50 |
| 2018/0232352 A1 * | 8/2018 | Fulford | ............... | G06F 16/9577 |

OTHER PUBLICATIONS

"Adobe Experience League", Adobe Inc. [retrieved Mar. 18, 2022]. Retrieved from the Internet <https://experienceleague.adobe.com/docs/experience-manager-cloud-service/content/implementing/using-cloud-manager/test-results/experience-audit-testing.html?lang=en>., 4 Pages.

"How Lighthouse in Tugboat works", Tugboat [retrieved Mar. 18, 2022]. Retrieved from the Internet <https://docs.tugboat.qa/lighthouse/using-lighthouse/>., 12 Pages.

"Lightkeeper", Craftcms,Craftcms.com [retrieved Mar. 18, 2022]. Retrieved from the Internet <https://plugins.craftcms.com/lightkeeper>., Jun. 5, 2021, 2 Pages.

(Continued)

*Primary Examiner* — Benjamin M Thieu
(74) *Attorney, Agent, or Firm* — FIG. 1 Patents

(57) ABSTRACT

Digital content operation testing techniques are described. An authoring environment supports edit operations to digital content. The authoring environment includes an option to initiate testing of operation of edited digital content at a publish environment of a content delivery network, at which, the digital content is to be deployed. Data describing results of the testing is then communicated over the network based to the digital content editing system. The data is output within the user interface of the authoring environment in this example such that an effect of edits made to the digital content are viewable non-modally within the authoring environment.

20 Claims, 6 Drawing Sheets

(56) References Cited

OTHER PUBLICATIONS

Andrews, Kyle, "Remove Lighthouse Widget #10", GitHub, Inc., Uploaded by codewithkyle [retrieved Mar. 18, 2022]. Retrieved from the Internet <https://github.com/codewithkyle/craft-lightkeeper/issues/10>., Jun. 5, 2021, 2 Pages.

Sridhar, Hemanth, "Lighthouse CI setup with Jenkins", Medium [retrieved Mar. 18, 2022]. Retrieved from the Internet <https://hemanthsridhar.medium.com/lighthouse-ci-setup-with-jenkins-4d555d818fea>., Mar. 23, 2020, 6 Pages.

\* cited by examiner

DIGITAL CONTENT OPERATION TESTING

BACKGROUND

A variety to types of digital content are made available via a network, from streaming digital movies, webpages, digital books and documents, digital images, digital audio, and so forth. Because the digital content is made available via the network, however, configuration of the digital content has a direct effect on accessibility to client devices that access this content via the network.

Although conventional techniques have been developed to provide insight into effects of the configuration of the digital content on the accessibility of the content, these conventional techniques often fail in real world scenarios. This typically results in an inability of conventional techniques to accurately determine and/or recreate operational conditions that encountered in real world scenarios. As such, conventional techniques can fail to accurately provide insight, and are also misleading in some scenarios, thereby having an adverse effect on actual deployment of the digital content.

SUMMARY

Digital content operation testing techniques are described that overcome conventional challenges to improve operation and accuracy in deployment of digital content by content delivery networks. To do so, the techniques described herein support an authoring environment that implements edit operations to digital content. The authoring environment includes an option to initiate testing of operation of edited digital content at a publish environment of a content delivery network, at which, the digital content is to be deployed. In an implementation, the test environment is not publicly accessible to client devices via the network.

Data describing results of the testing is then communicated over the network based to the digital content editing system, e.g., from the content delivery network and/or the testing utility. The data is output within the user interface of the authoring environment in this example such that an effect of edits made to the digital content are viewable non-modally within the authoring environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
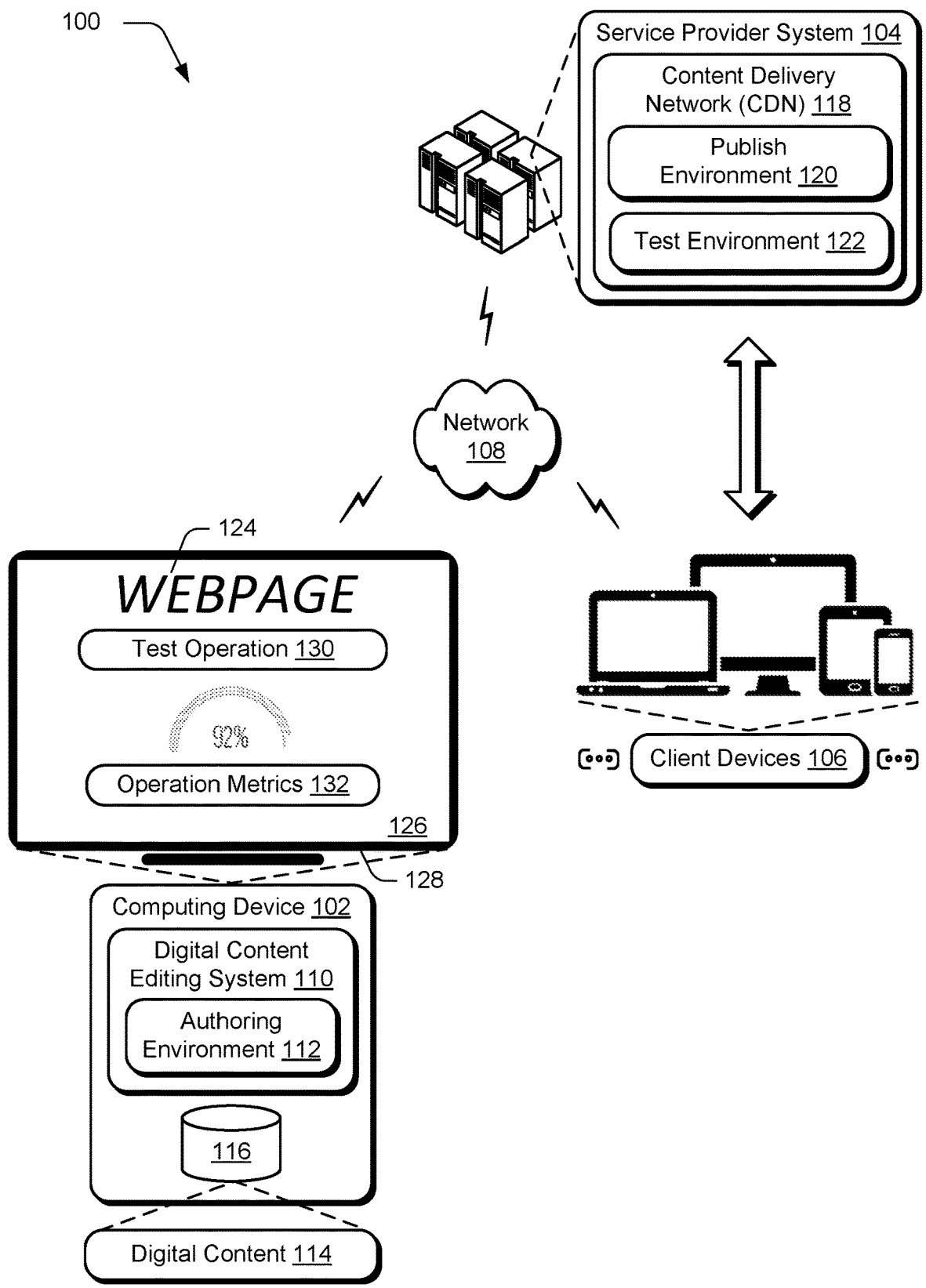
FIG. 1 is an illustration of an environment in an example implementation that is operable to employ digital content operation testing techniques described herein.

Digital content that is made available via a network is configurable in a variety of ways. However, variations in the configuration also have a direct effect on accessibility of this digital content to client devices via the network. Consider an example in which the digital content is a webpage. Inclusion of rich digital content such as digital images, digital videos, and so on within the webpage affects an ability of a client device to download and render the webpage from a content delivery network that implements a website that makes the webpage available. Conventional techniques that have been developed to provide insight into operation of the digital content and effects of changes to components on operation of the digital content, however, typically lack accuracy even to the point of hindering operation of the digital content when actually deployed.

Accordingly, digital content operation testing techniques are described that overcome conventional challenges to improve operation and accuracy in deployment of digital content by content delivery networks. To do so, the techniques described herein support an authoring environment that supports edit operations to digital content. The authoring environment includes an option to initiate testing of the digital content, once edited, in a test environment maintained by a content delivery network (CDN) that is to be employed to publish (i.e., deploy) the digital content for access by client devices via a network. As a result, the techniques described herein support increased accuracy over conventional techniques that limit testing to local performance at the device that edits the digital content but is not used to actually deploy the digital content.

In one example, a digital content editing system implements an authoring environment, via which, inputs are received to edit digital content, which in this example is a webpage. The authoring environment, for instance, includes functionality to obtain the webpage from a content delivery network that implements a website. In another instance, the webpage is stored locally by the system and is selected by a user.

Edits are made to the webpage responsive to inputs received via a user interface output as part of the authoring environment, e.g., through corresponding edit operations. Once desired edits to the webpage are made, a user input is received by selecting an option in the user interface to initiate operation testing of the webpage. In response, a markup of the webpage is generated, which is used to form a communication (e.g., "zipped") along with referenced assets of the webpage, e.g., digital images, JavaScript, cascading style sheet (CSS) files, and so on. This communication is then transmitted via a network to the content delivery network, e.g., from which the webpage is received, based on an input specified manually by a user, and so forth.

The content delivery network includes a test environment, in which, operation of the webpage is to be tested. In an implementation, the test environment is not publicly accessible to client devices via the network. To do so, information from the webpage is removed that is usable to locate the webpage, such as by removing headers and metadata that are usable by a search engine system to index the webpage for location by browsers of the client devices. Other examples are also contemplated in which the edited digital content is maintained in a test environment by the content delivery network that is not publicly available, the test environment is configured to remove this information, and so on.

A testing utility is then initiated to test operation of the edited digital content within the test environment of the content delivery network. The testing utility, for instance, is implemented via a third-party system that is permitted access to the test environment, e.g., by the digital content editing system, the content delivery network, and so on. Testing of the digital content includes a variety of operations, examples of which include performance metrics, accessibility metrics, compliance metrics (e.g., with best practices), search engine optimization metrics, and so forth that are performable between the third-party system and the test environment of the content delivery network via a network connection.

Data describing results of the testing is then communicated over the network based to the digital content editing system, e.g., from the content delivery network and/or the testing utility. The data is output within the user interface of the authoring environment in this example such that an effect of edits made to the digital content are viewable non-modally within the authoring environment, e.g., without involving navigation "outside" of this environment to access different applications, tools, and so forth.

Based on the results, options are made available to specify further edits to the digital content, options to publish the edited digital content to the content delivery network, and so on. The content delivery network, for instance, also includes a publish environment, via which, the edited digital content is made accessible to the client devices. In one example, the edited digital content is used to replace the digital content that is made available via the network during the editing process. In this way, uninterrupted access is provided to the digital content. Additionally, an effect of edits made to the content at the actual content delivery network is determined before deployment of the content, thereby improving operation of underlying devices that implement the network. Further discussion of these and other examples is described in the following sections and shown in corresponding figures.

Term Examples

"Digital content" includes any type of data that is configured for storage electronically and for rendering in a user interface. Examples of digital content include webpages, digital video, digital audio, digital documents, digital images, and other types of digital media.

A "content delivery network" (also known as a content distribution network) is implementable as a distributed network of proxy servers and data centers that are configured to provide access to digital content via a network. The content delivery network, for instance, is configurable to implement a publish environment (e.g., web service) via which digital content is made available, i.e., disseminated. As such, the content delivery network is configurable as a layer of the network between authors and client devices that are to access the digital content. A content delivery network is configurable in a variety of ways to implement different types of content delivery services, examples of which include streaming data, software downloads, caching and other types of digital services including security, firewalls, and so forth.

"Operation testing" is typically implemented through use of a "testing utility," e.g., as a third-party system separate from the content delivery network. Operation testing includes resources consumed at the content delivery network to store the digital content, process the digital content, and/or access the digital content via the network. Examples of operation testing data include performance metrics, accessibility metrics, compliance (e.g., with best practices) metrics, search engine optimization (SEO) metrics, and so on.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Content Operation Testing Environment

FIG. 1 is an illustration of a digital medium operation testing environment 100 in an example implementation that is operable to employ techniques described herein. The illustrated environment 100 includes a computing device 102, a service provider system 104, and client devices 106 that are communicatively coupled, one to another, via a network 108. Computing devices that implement these entities are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown in instances in the following discussion, reference to a computing device is also representative of a plurality of different devices, such as multiple servers utilized by a business to perform operations "over the cloud" as described in FIG. 7.

The computing device 102 is illustrated as including a digital content editing system 110. The digital content editing system 110 is implemented at least partially in hardware of the computing device 102 to implement an authoring environment 112. The authoring environment 112 is configured to create the digital content 114, modify the digital content 114, and render the digital content 114. Although illustrated as implemented locally at the computing device 102, functionality of the digital content editing system 110 is also configurable as whole or part via functionality available via the network 108, such as part of a web service or "in the cloud."

The authoring environment 112 is configurable to permit a user, even with limited expertise, to edit the digital content 114, e.g., to add, modify, and remove components of the digital content 114. In an example, the digital content 114 is configured as a webpage formed using a markup language, e.g., hypertext markup language (HTML). The digital content 114, once created, is communicated in the illustrated example over a network 108 to service provider system 104 that implements a content delivery network (CDN) 118.

The content delivery network 118 (also known as a content distribution network) is implementable as a distributed network of proxy servers and data centers that are configured to provide access to the digital content 114 via a publish environment 120. The content delivery network 118 is typically implemented as an entity using corresponding computing devices than those used by the computing device 102 to implement the authoring environment 112. As such, the content delivery network 118 is configurable as a layer of the network 108 between authors of the computing device 102 and client device 106 that are to access the digital content 114.

As previously described, the digital content 114 is configurable in a variety of ways, examples of which include webpages, digital images, digital video, digital audio, digital documents, and other types of digital media. Therefore, the content delivery network 118 is also configured in a variety of ways to implement different types of content delivery services, examples of which include streaming data, software downloads, caching and other types of digital services including security, firewalls, and so forth.

In the illustrated environment, digital content 114 is authored in the authoring environment 112 that is implemented by different computing devices than those used to implement the publish environment 120 of the content delivery network 118. Because of this, conventional operational testing techniques often fail to accurately test operation of the digital content 114. This is because conventional techniques are configured to test operation of the digital content 114 at the computing device 102 that is used to create the digital content 114, but not at the content delivery network 118, itself, that is actually used to distribute the content. In conventional techniques, for instance, testing is performed in a "safe" and often "feature rich" environment in the authoring environment which is quite different from content delivery networks and client devices that are employed in remote corners of the world, have quite different amounts of site traffic, and so on. Even in an instance of centralized servers, it is often impossible in conventional techniques to accurately test operation and "what the end user sees" do to functionality implemented by these servers and client devices, e.g., VPNs.

Further, in conventional techniques operational testing of the digital content 114 is not possible in real world scenarios until it is made publicly available via the publish environment 120. Consequently, any undesirable edits to the digital content 114 were not detected until having an adverse effect on client devices 106 that accessed the digital content via the publish environment 120. This results in a diminished user experience and inefficient operation of computing devices that implement the service provider system 104 and the client devices 106.

Accordingly, the digital content editing system 110 and convent delivery network 118 are configured to utilize and implement a test environment 122 via which operation of the digital content 114 is tested using actual hardware and/or software functionality used to implement the content delivery network 118, via which, the digital content 114 is to be published using the publish environment 120. Further, the test environment 122 is not made publicly available during testing such that this testing does not hinder operation of the publish environment 120.

Digital content 114, for example, is configurable to include a wide range of components, which include additional items of digital content. An illustrated example of digital content 114 includes a webpage 124 that is illustrated as displayed in a user interface 126 by a display device 128. Webpages 124 take a variety of forms, such as to include text, digital images, digital video, executable code, digital audio, animations, and so forth. Because of this, operation of the digital content 114 varies greatly based on which components are included within the digital content 114. Operation of the digital content 114 includes an ability to communicate the digital content 114 from the publish environment 120 to the client devices 106, an ability (e.g., speed) of the client devices 106 to render the digital content 114, security of the digital content 114 (e.g., from exploit by malicious parties), and so forth.

In practice, web developers are typically responsible for creating building blocks of the webpage 124, and a web production team is responsible for creating the webpage 124 using these building blocks, which is then published. These building blocks are reusable components which are configurable for holding, formatting, and rendering the components as tied to a behavior. The authoring environment 112, therefore, is implemented to create and/or edit the webpage 124 in this example using these building blocks. Due to limitations of conventional testing techniques that are constrained to testing the digital content at the authoring environment, issues that arise when publishing the webpage 124 at the publish environment 120 are not detectable, e.g., to detect non-performant components, security leaks, performance, and other operational considerations.

Operation of the webpage 124 is a critical component in overall usage of the webpage in real world scenarios. For example, it has been found that fifty-seven percent of visitors leave a website if the webpage 124 does not load and render within three seconds, eighty percent of those users do not return, and approximately half of those users communicate this experience to other users. Consequently, even minor changes entail significant risks in access and corresponding webpage visits, engagement, and so forth. Further, even minor changes have been found to have a direct effect on operation of the computing devices that disseminate the digital content 114 via the publish environment and consume the digital content 114 at the client devices 106.

Accordingly, the illustrated authoring environment 112 includes an option 130 that is selectable to initiate testing of operation of the digital content 114 within the test environment 122 implemented by the content delivery network 118. In this way, operation of the digital content 114 is performed using actual devices and software that will also be used to disseminate and distribute the digital content 114 via the publish environment 120. Operation metrics 132 are then received that indicate a result of this testing and are displayed within the user interface 126 of the authoring environment 112. This supports non-modal testing thereby allowing a user to remain within the authoring environment 112 to edit the digital content 114 and yet gain insight into operation of the digital content 114 via the test environment 122. Further discussion of these and other examples is included in the following section and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Content Operation Testing

The following discussion describes techniques that are implementable utilizing the previously described systems and devices to employ digital content operation testing. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 2-5 in parallel along with a procedure 600 of FIG. 6.

Figure 2:
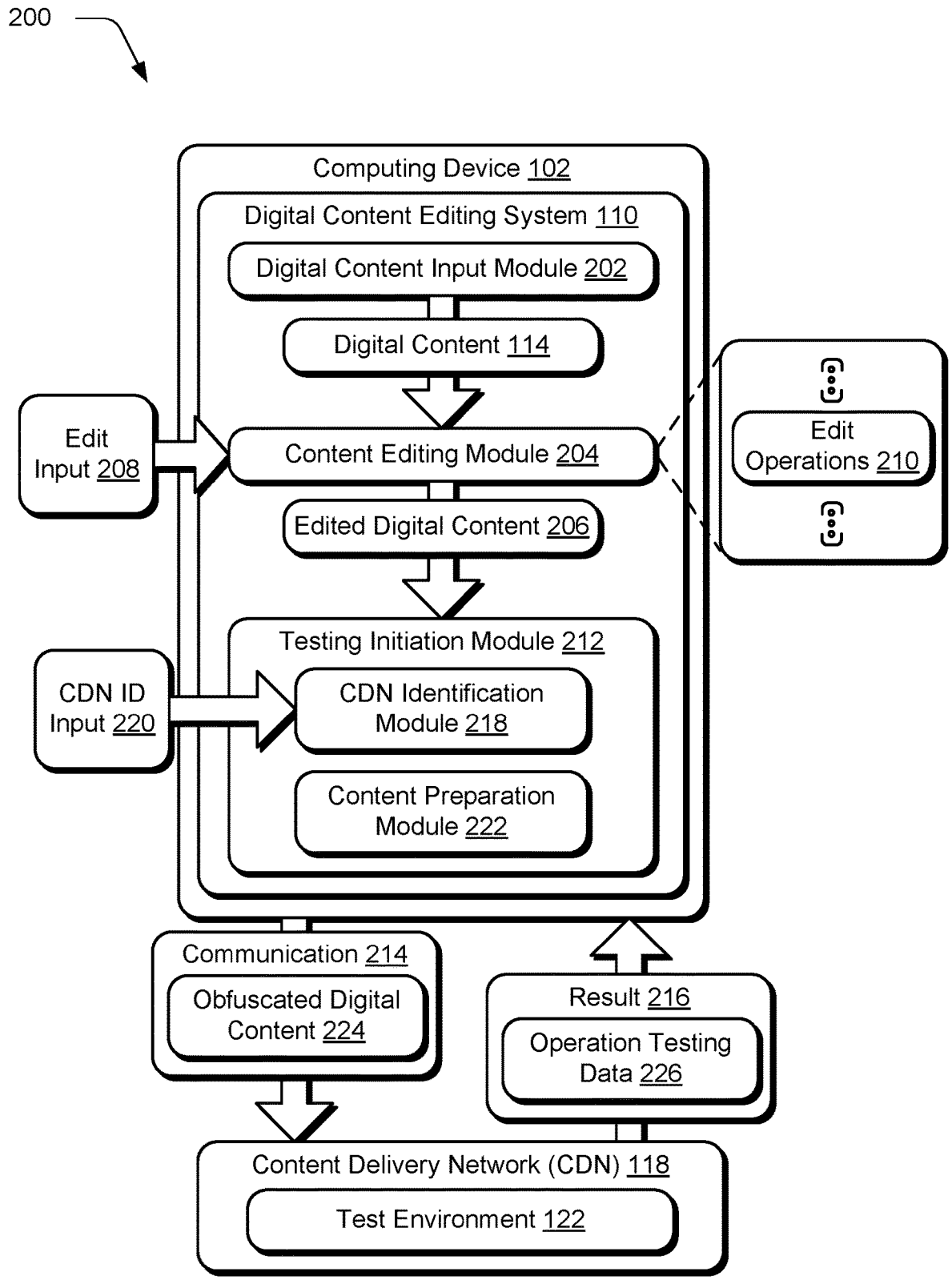
FIG. 2 depicts a system in an example implementation showing operation of a digital content editing system of FIG. 1 in greater detail as editing digital content and initiating operational testing of the edited digital content in a testing environment of a content delivery network (CDN).

FIG. 2 depicts a system 200 in an example implementation showing operation of the digital content editing system 110 of FIG. 1 in greater detail as editing digital content and initiating operational testing of the edited digital content in a testing environment of a content delivery network (CDN). To begin in this example, a digital content input module 202 obtains digital content from a content delivery network 118 (block 602). In one instance, an input is received via the user interface 126 that specifies a location (e.g., network address, URL) via which the digital content 114 is available, and the digital content 114 is downloaded in response to this input by the digital content input module 202. Other instances are also contemplated, such as to load the digital content 114 from a local storage device 116 of the computing device 102 that implemented the digital content editing system 110 as shown in FIG. 1.

The digital content 114 is then passed to a content editing module 204. The content editing module is configured to implement the authoring environment 112 to edit the digital content 114. The authoring environment 112 is configured to form edited digital content 206 based on an edit input 208 received via a user interface 126 (block 604). The content editing module 204, for instance, supports a variety of edit operations 210 to add, remove, change, and relocate components of digital content 114 to form the edited digital content 206 within an authoring environment 112 implemented by the digital content editing system 110. Thus, this content is an edited version of the digital content 114. The edit operations 210 vary based on a type of digital content 114 being edited, such as to change pixels, audio, video, add or remove components, and so forth. In an implementation, the digital content 114 is configured according to a markup language and the edits involve changes to the markup language.

Figure 3:
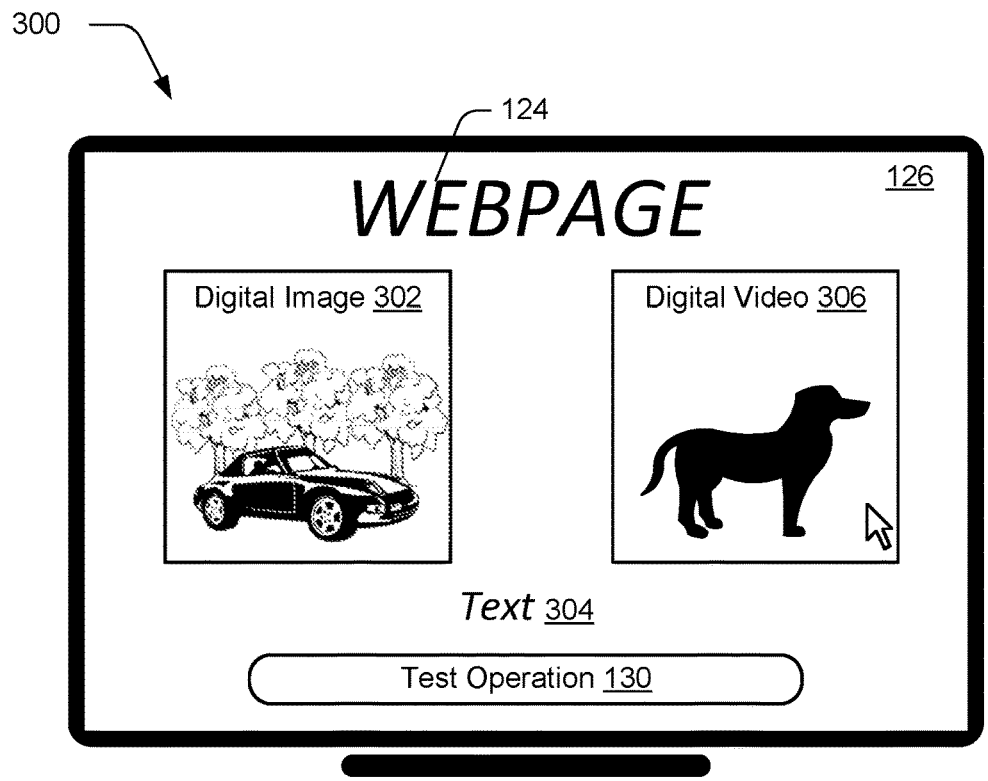
FIG. 3 depicts an example of a user interface output as part of an authoring environment that is configured to edit digital content and initiate operation testing of the edited digital content.

FIG. 3 depicts an example 300 of a user interface 126 output as part of an authoring environment 112 that is configured to edit digital content and initiate operation testing of the edited digital content. The digital content 114 is configured as a webpage 124 in this example. The webpage 124 as previously described is configurable to include a variety of components, including different types of digital content such as a digital image 302 and text 304 in the illustrated example. The edit input 208 specifies inclusion of an additional component, which is a digital video 306 in the illustrated example. Once edited as desired, a user input is received via the user interface 126 selecting an option 130 to initiate testing of the edited digital content 206.

Responsive to selection of the option 130, the edited digital content 206 is passed to a testing initiation module 212. The testing initiation module 212 is configured to form a communication 214 for transmission via the network 108 to the content delivery network 118. Operation of the edited digital content 206 is then tested at the test environment 122 and a result 216 is received that describes this operation.

To do so, the testing initiation module 212 in this example includes a CDN identification module 218 that is configured to receive an input identifying the content delivery network (block 606), at which, the edited digital content 206 is to be tested. Continuing the example above in which the digital content 114 is received from the content delivery network 118, the CDN ID input 220 is received from the digital content input module 202. In an example in which the digital content 114 is obtained locally from the local storage device 116, the CDN ID input 220 is received via the user interface 126, e.g., as entered manually by a user.

The testing initiation module 212 also includes a content preparation module 222 that is configured to prepare the edited digital content 206 for testing in the test environment 122. In one example, the content preparation module 222 is configured to remove information that is identifiable by a search engine (block 608), e.g., headers, metadata information, and so on. In this way, the edited digital content 206 is formed as obfuscated digital content 224 that is not locatable "outside" the test environment 122, e.g., by the search engine as part of "crawling" the Internet. The content preparation module 222 is also configured to include assets (e.g., images JavaScript®, cascading stylesheets (CSS) files, etc.) referenced by the edited digital content 206, e.g., via URLs included in a markup language forming the edited digital content 206. The assets and digital content are combined (e.g., zipped) to form the communication 214. Other examples are also contemplated in which this preparation is performed at the content delivery network 118, e.g., as part of the test environment.

This digital content is then transmitted (e.g., as edited digital content 206 and/or edited digital content 206 used to generate the obfuscated digital content 224) to a test environment 122 of the content delivery network 118 (block 610). A testing utility is initiated (e.g., by the testing initiation module 212) to test operation of the edited digital content 206 within the test environment 122 of the content delivery network 118, (block 612), further description of which is described in the following and shown in a corresponding figure.

Figure 5:
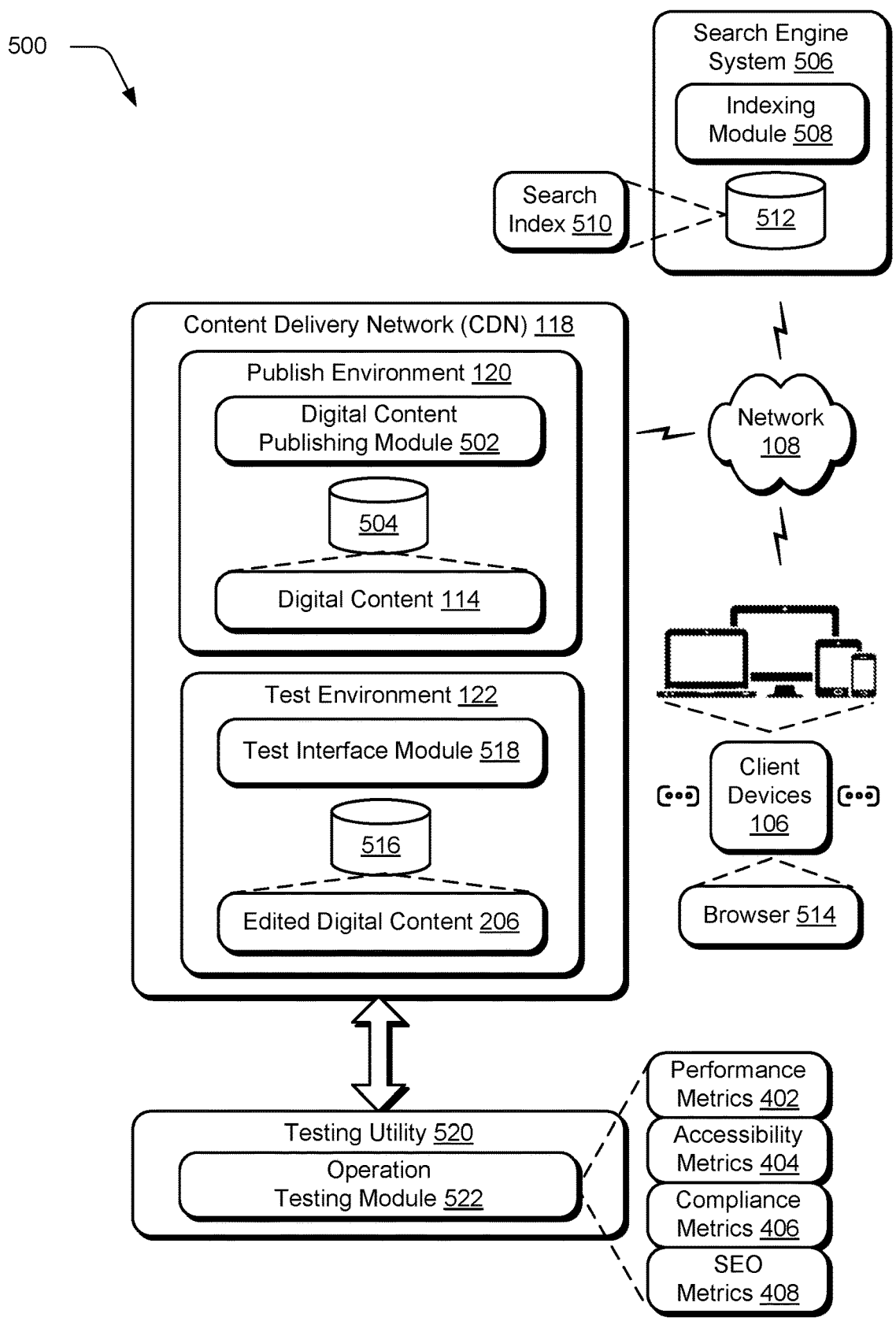
FIG. 5 depicts a system in an example implementation showing operation of the content delivery network (CDN) of FIG. 2 as implementing a publish environment and a test environment.
Figure 6:
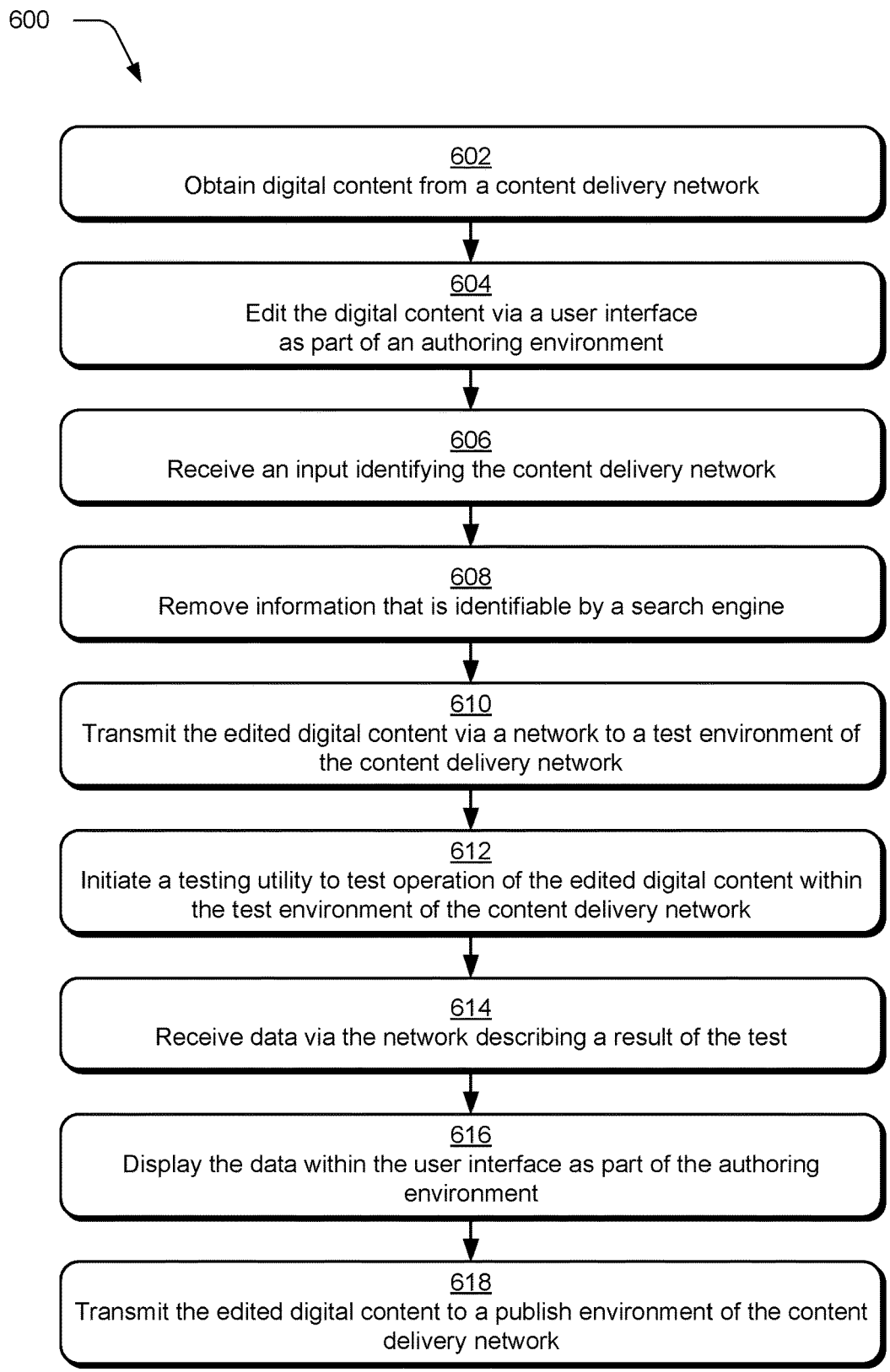
FIG. 6 is a flow diagram depicting a procedure in an example implementation of digital content operation testing.

FIG. 5 depicts a system 500 in an example implementation showing operation of the content delivery network (CDN) 118 of FIG. 2 as implementing a publish environment 120 and a test environment 122. In order to implement that publish environment 120, the content delivery network 118 uses webservers, network switches, corresponding software (e.g., to implement virtual network devices), storage devices, and so forth. The publish environment 120 includes a digital content publishing module 502 that is configured to make digital content 114 stored in a storage device 504 accessible via a network 108, e.g., to a search engine system 506, client devices 106, and so on.

The search engine system 506, for instance, includes an indexing module 508 that is configured to "crawl" hundreds of billions of network addresses, via which, corresponding webpages and other digital content 114 are made available. A result of this is maintained by a storage device 512 as a search index 510 that is used by browser 514 of the client devices 106 to locate digital content 114 of interest using respective search algorithms, e.g., via respective content delivery networks 118. Therefore, in this instance the digital content 114 is made available to the search engine system 506 and therefore to client devices 106 that use the search engine system 506 to locate digital content of interest, e.g., via respective network addresses at the content delivery network.

The test environment 122, on the other hand, is not publicly accessible via the network 108 to the search engine system 506 and/or the client devices 106. However, the test environment 122 is implemented using the webservers, network switches, corresponding software (e.g., to implement virtual network devices), storage devices, and so forth also used by the publish environment 120 to disseminate the digital content 114.

To implement this, the test interface module 518 of the test environment 122 maintains the edited digital content 206 in a test folder, directory, and so on of a storage device 516. The test environment 122 is not publicly available, e.g., to the search engine system 506, and the client devices 106. However, the test environment 122 is made available to a testing utility 520 to test operation of the edited digital content 206 at the content delivery network 118.

The testing utility 520 includes an operation testing module 522 that is configured to generate operation testing data 226 (e.g., metrics) describing operation of the edited digital content 206. This data is usable to describe resource consumed at the content delivery network 118 to store the edited digital content 206, process the edited digital content 206, and/or access the edited digital content 206 via the network 108. Examples of operation testing data 226 include performance metrics 402, accessibility metrics 404, compliance metrics 406, search engine optimization (SEO) metrics 408, and so on. A result 216 including operation testing data 226 resulting from the testing is then communicated to the digital content editing system 110, e.g., directly from the testing utility 520, indirectly through the content delivery network 118, and so forth.

Figure 4:
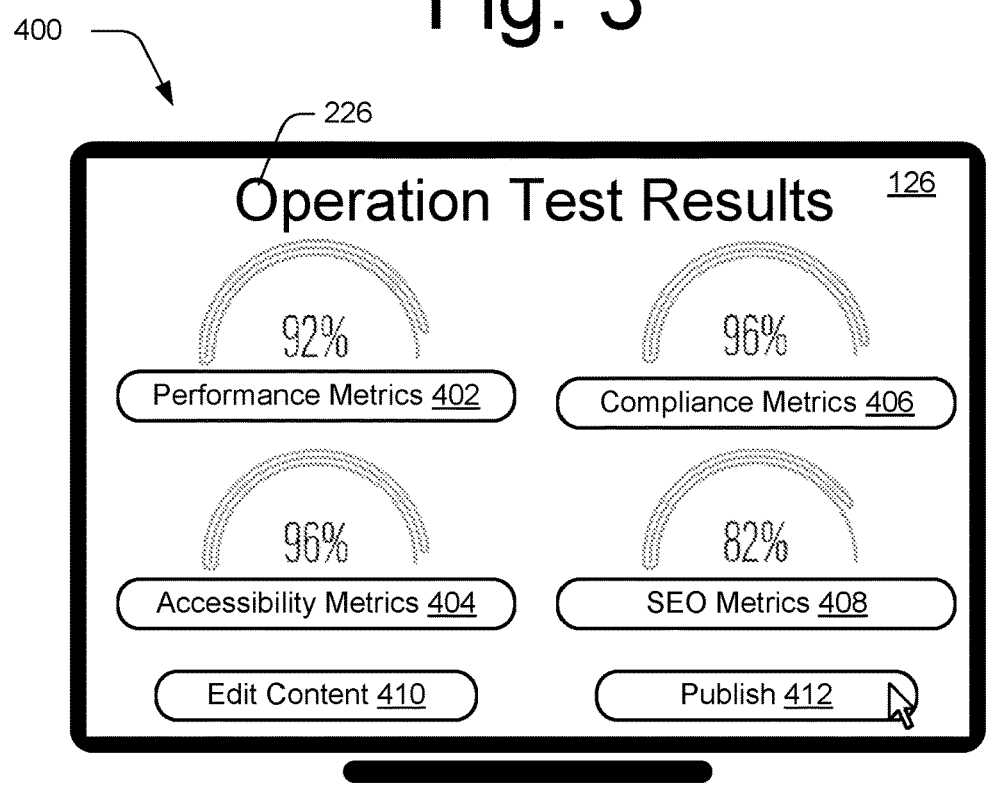
FIG. 4 depicts an example of a user interface output as part of an authoring environment that includes a result of operation testing of the edited digital content of FIG. 3.

FIG. 4 depicts an example 400 of a user interface 126 output as part of an authoring environment that includes a result 216 of operation testing of the edited digital content of FIG. 2. In this example, the digital content editing system 110 receives data via the network 108 describing a result 216 of the test (block 614). The data is then displaying within the user interface 126 as part of the authoring environment 112 (block 616).

In the illustrated example 400, graphics are used that describe relative amounts for respective metrics. These graphics are then selectable to determine additional information, e.g., view additional sub-metrics, potential causes of the metric, and so forth. In this example, a user interface 126 output as part of the authoring environment 112 to edit the digital content 114 is also used to view results of testing of operation of the edited digital content 206 by an actual content delivery network 118 that is to deploy the content, i.e., is non-modal. In this way, results of the testing have increased accuracy over conventional testing techniques, that in some instances can hinder operation of the digital content by provide guidance that in practice is not accurate.

The user interface 126 of FIG. 4 also includes an option 410 to further edit the digital content, e.g., to address issues identified in the result 216. Once edits to the digital content are completed, an option 412 is also provided to transmit the edited digital content to a publish environment 120 of the content delivery network 118 (block 618). In this example, the digital content 114 remains available during the testing of the edited digital content 206, and is replaced after this testing. This promotes a continued ability of the client devices 106 to access digital content and reduces a likelihood that the edited digital content 206 will have an adverse effect due to the testing, which improves operation of underlying computing devices that implement these techniques.

Example System and Device

Figure 7:
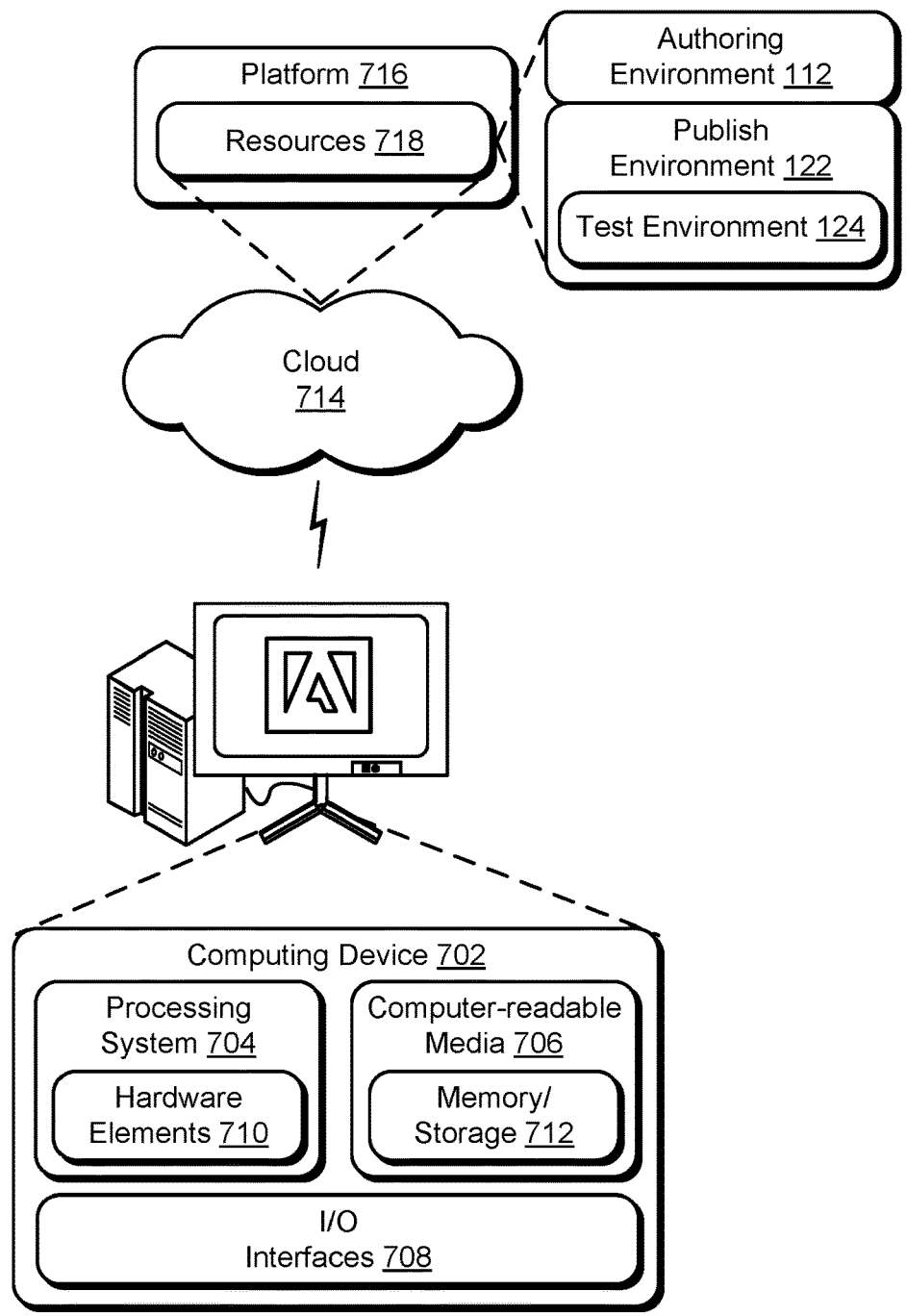
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the authoring environment 112, publish environment 120, and test environment 122. The computing device 702 is configurable, for example, as a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality is also implementable all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
   editing, by the processing device, digital content via a user interface as part of an authoring environment, the digital content being a webpage;
   transmitting, by the processing device, the edited digital content via a network to a test environment of a content delivery network, the test environment of the content delivery network being inaccessible via public search engine;
   initiating, by the processing device, a testing utility to test operation of the edited digital content within the test environment at the content delivery network;
   receiving, by the processing device, data via the network describing a result of the test;
   displaying, by the processing device, the data within the user interface as part of the authoring environment; and
   transmitting the edited digital content to a publish environment of the content delivery network, the content delivery network making the publish environment accessible via public search engine.

2. The method as described in claim 1, wherein the transmitting is performed responsive to selection of an option via the user interface to test the operation of the edited digital content.

3. The method as described in claim 1, further comprising removing information from the edited digital content that is identifiable by a search engine to locate the edited digital content, the information including headers or metadata associated with the webpage.

4. The method as described in claim 3, further comprising obtaining the digital content from the content delivery network, the editing is performed on the received digital content, and the information is usable to locate the digital content at the content delivery network via the network.

5. The method as described in claim 3, wherein the digital content remains publicly available via the content delivery network via a publish environment during the testing of the edited digital content via the test environment.

6. The method as described in claim 1, further comprising receiving, by the processing device, an input identifying the content delivery network that is configured to provide access to the digital content to client devices via the network and wherein the transmitting to the test environment is performed based on the input.

7. The method as described in claim 1, wherein the result indicates operation of the edited digital content at the content delivery network, the operation including a performance metric, accessibility, compliance with best practice metric, or search engine optimization metric.

8. The method described in claim 1, wherein the data is usable to describe resources consumed at the content delivery network to store, process and/or access the webpage via the content delivery network.

9. The method as described in claim 1, wherein the data is usable to describe a speed of client devices to render the webpage.

10. A system implementing a content delivery network, the system comprising:
    a digital content publishing module implemented using at least one computing device, the digital content publishing module implementing a publish environment via which digital content is made publicly accessible via a network to client devices, the digital content being a webpage, the content delivery network making the publish environment accessible via public search engine; and
    a test interface module implemented using the at least one computing device, the test interface module implementing a test environment via which an edited version of the digital content is made available via the network for operational testing by an operation test system, the test environment of the content delivery network being inaccessible via public search engine.

11. The system as described in claim 10, wherein the test interface module is configured to receive the edited version of the digital content from a computing device and return data indicating a result of the operational testing received from the operation test system to the computing device.

12. The system as described in claim 11, wherein the result indicates operation of the edited version of the digital content at the content delivery network, the operation including a performance metric, accessibility, compliance with best practice metric, or search engine optimization metric.

13. The system described in claim 11, wherein the data is usable to describe resources consumed at the content delivery network to store, process and/or access the webpage via the content delivery network.

14. The system as described in claim 11, wherein the data is usable to describe a speed of client devices to render the webpage.

15. The system as described in claim 10, wherein the digital content includes publicly identifying information that is configured to locate the digital content via the network and the edited version of the digital content has the publicly identifying information removed.

16. A system comprising:
    means for receiving digital content from a publish environment of a content delivery network, the digital content being a webpage, the content delivery network making the publish environment accessible via public search engine;
    means for editing the digital content via a user interface as part of an authoring environment;
    means for initiating a testing utility to test operation of the edited digital content within a test environment at the content delivery network, the test environment of the content delivery network being inaccessible via public search engine; and
    means for displaying data received via the network within the user interface as part of the authoring environment, the data describing operation of the edited digital content at the content delivery network.

17. The system as described in claim 16, further comprising means for removing information from the edited digital content that is identifiable by a search engine to locate the edited digital content.

18. The system as described in claim 16, wherein the digital content remains publicly available via the content delivery network via a publish environment during the testing of the edited digital content via the test environment.

19. The system described in claim 16, wherein the data is usable to describe resources consumed at the content delivery network to store, process and/or access the webpage via the content delivery network.

20. The system as described in claim 16, wherein the data is usable to describe a speed of client devices to render the webpage.

* * * * *